(12) United States Patent
Bruggenschmidt et al.

(10) Patent No.: US 10,950,136 B2
(45) Date of Patent: Mar. 16, 2021

(54) ATV EDUCATIONAL DEMONSTRATION SYSTEM

(71) Applicant: Play For Kate, Inc., Tennyson, IN (US)

(72) Inventors: Ashlee Bruggenschmidt, Tennyson, IN (US); Eric Bruggenschmidt, Tennyson, IN (US); William Browne, Connersville, IN (US); Danny L. East, Greenwood, IN (US)

(73) Assignee: Play For Kate, Inc., Tennyson, IN (US)

( * ) Notice: Subject to any disclaimer, the term of this patent is extended or adjusted under 35 U.S.C. 154(b) by 284 days.

(21) Appl. No.: 16/050,861

(22) Filed: Jul. 31, 2018

(65) Prior Publication Data

US 2019/0051207 A1 Feb. 14, 2019

Related U.S. Application Data

(60) Provisional application No. 62/543,109, filed on Aug. 9, 2017.

(51) Int. Cl.
*G09B 9/05* (2006.01)
*B25J 11/00* (2006.01)
*G05D 1/00* (2006.01)

(52) U.S. Cl.
CPC ............... *G09B 9/05* (2013.01); *B25J 11/00* (2013.01); *G05D 1/0016* (2013.01); *G05D 1/0038* (2013.01); *G05D 2201/0214* (2013.01)

(58) Field of Classification Search
CPC ...................................................... G09B 9/05
USPC ............................................................ 434/62
See application file for complete search history.

(56) References Cited

U.S. PATENT DOCUMENTS

| 5,209,662 A * | 5/1993 | Fujita | G09B 9/05 273/442 |
|---|---|---|---|
| 2009/0136903 A1* | 5/2009 | McNeil | G09B 9/058 434/29 |
| 2010/0167625 A1 | 7/2010 | Conway | |
| 2016/0167222 A1* | 6/2016 | Ead | B25J 9/104 700/257 |

OTHER PUBLICATIONS

"Autonomous Motorcycle-Riding Humanoid Robot to Best Rossi on the Racetrack", 5 pages. https://global.yamaha-motor.com/showroom/event/tokyo-motorshow-2015/exhibitionmodels/mgp/.
"Radio Control Vehicle: Owners Manual", New Bright, 2 pages.
"Fast Lane 1:6 Scale Remote Control Yamaha Raptor 700R", Toys R Us, 8 pages.

* cited by examiner

*Primary Examiner* — Thomas J Hong
(74) *Attorney, Agent, or Firm* — Barnes & Thornburg LLP

(57) ABSTRACT

An ATV educational demonstration system includes an ATV and an animatronic rider coupled to the ATV. In an illustrative embodiment, the system also includes a control system adapted to control the ATV and the animatronic rider.

19 Claims, 8 Drawing Sheets

ATV EDUCATIONAL DEMONSTRATION SYSTEM

CROSS REFERENCE TO RELATED APPLICATIONS

This application claims priority to and the benefit of U.S. Provisional Patent Application No. 62/543,109, filed 9 Aug. 2017, the disclosure of which is now expressly incorporated herein by reference.

FIELD OF THE DISCLOSURE

The present disclosure relates generally to education and demonstration of all-terrain vehicle (ATV) use, and more specifically to remotely controlled devices for education and demonstration of ATV use.

BACKGROUND

The successful operation of an ATV can be influenced by the level experience a rider has along with proper education related to ATV operation. New riders often benefit most from formal rider education and proper operation demonstrations. However, even experienced riders can benefit from demonstrations of proper ATV operation.

Live-action demonstrations of proper ATV operation can be more engaging, and therefore more effective, than video demonstrations or two-dimensional schematic demonstrations. Accordingly, there is a need for live-action ATV demonstration systems.

SUMMARY

An all-terrain vehicle (ATV) educational demonstration system according to the present disclosure includes an ATV and an animatronic rider. The ATV is illustratively of the four-wheel type having a bench seat designed to be straddled by the rider. The animatronic or robot rider is mounted to the ATV such that the animatronic rider straddles the bench seat between her legs showing proper riding posture to an audience.

In illustrative embodiments, the animatronic rider may be outfitted with a helmet, goggles, gloves, and safety pads to demonstrate the use of various safety equipment adapted for use with an ATV. The animatronic rider may also be configured for motion relative to the ATV so as to show proper riding positions depending on the terrain and/or motion of the ATV. Animatronic rider motions may also facilitate communication with audiences via head nods, head shakes, hand waves, and other suitable motions.

In illustrative embodiments, a communication system may be incorporated into the system. For example, a speaker may be mounted inside the helmet of the animatronic rider that can project responses and information to an audience. An external speaker system can be linked into the communication system and can also project the same responses and information so as to amplify the sound coming from the speaker associated with the animatronic rider.

In illustrative embodiments, the ATV and the animatronic rider may be remotely controlled by a user. The remote control may control various motions of the ATV and the animatronic rider. The remote control may also provide an audio link to the communication system.

In illustrative embodiments, the ATV may be outfitted with various lights designed to enhance demonstrations. In one example, lights may be illuminated to illustrate which braking mechanisms should be used in specific situations.

In illustrative embodiments, the ATV may include speed-restriction and/or obstacle detection features. These features may be helpful when using the system near audience members and/or in tight spaces.

These and other features of the present disclosure will become more apparent from the following description of the illustrative embodiments.

DETAILED DESCRIPTION OF THE DRAWINGS

Figure 1:
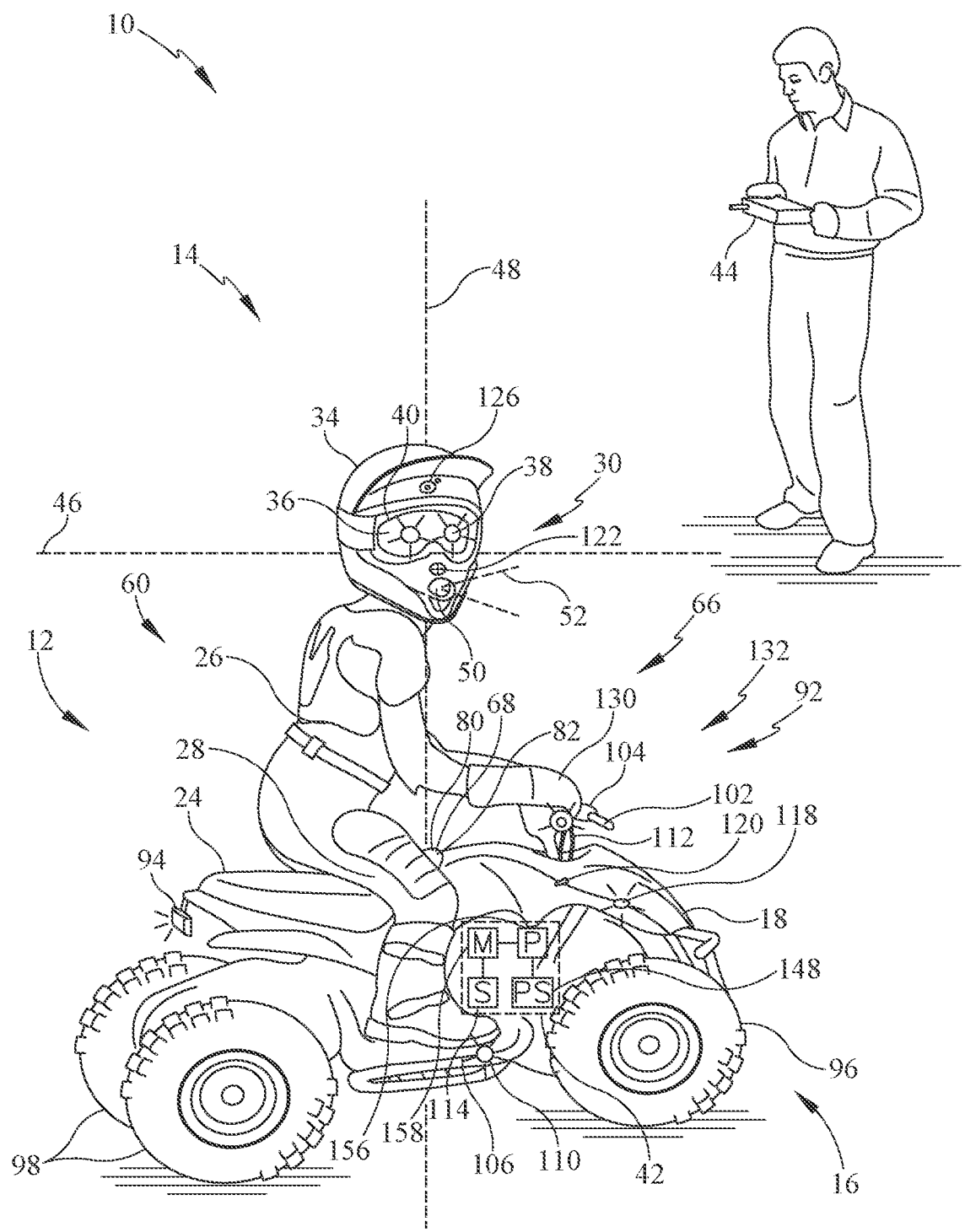
FIG. 1 is a perspective view of an illustrative embodiment of an ATV educational demonstration system comprising an ATV, an animatronic rider, and a control system, and showing the animatronic rider situated on top of the ATV such that each foot of the animatronic rider is coupled to a footrest of the ATV.

For the purposes of promoting an understanding of the principles of the disclosure, reference will now be made to a number of illustrative embodiments illustrated in the drawings and specific language will be used to describe the same.

An illustrative ATV educational demonstration system 10 includes an ATV 12 and an animatronic rider 14, as shown in FIG. 1. The ATV 12 includes a frame 18 with a footrest 20, a mobility unit 22 configured to propel the frame 18 relative to the ground, and an unframed bench seat 24 adapted to be straddled by the animatronic rider 14. The animatronic rider 14 includes a torso 26 positioned over the unframed bench seat 24, legs 28 positioned between the torso 26, fluidly coupled to the torso 26 and optionally coupled to the footrest 20, a head unit 30 positioned over the torso 26 relative to the ground and fluidly coupled to the torso 26 opposite the legs 28, and a motion unit 32 configured to move the torso 26 relative to the unframed bench seat 24 of the ATV 12.

The head unit 30 includes a helmet 34, an at least semi-transparent eye shield 36, and a pair of eye light modules 38 arranged inside the helmet 34, as shown in FIG. 1. The pair of eye light modules 38 is arranged within helmet to resemble eyes of a human rider. The pair of eye light modules 38 is positioned relative to the semi-transparent eye shield 36 so as to be visible from outside the helmet 34 so that an audience may see the pair of eye light modules 38. The semi-transparent eye shield 36 is included in safety goggles 40 to demonstrate the protective function of the semi-transparent eye shield 36 for the eye light modules 38 of the animatronic rider 14.

Figure 2:
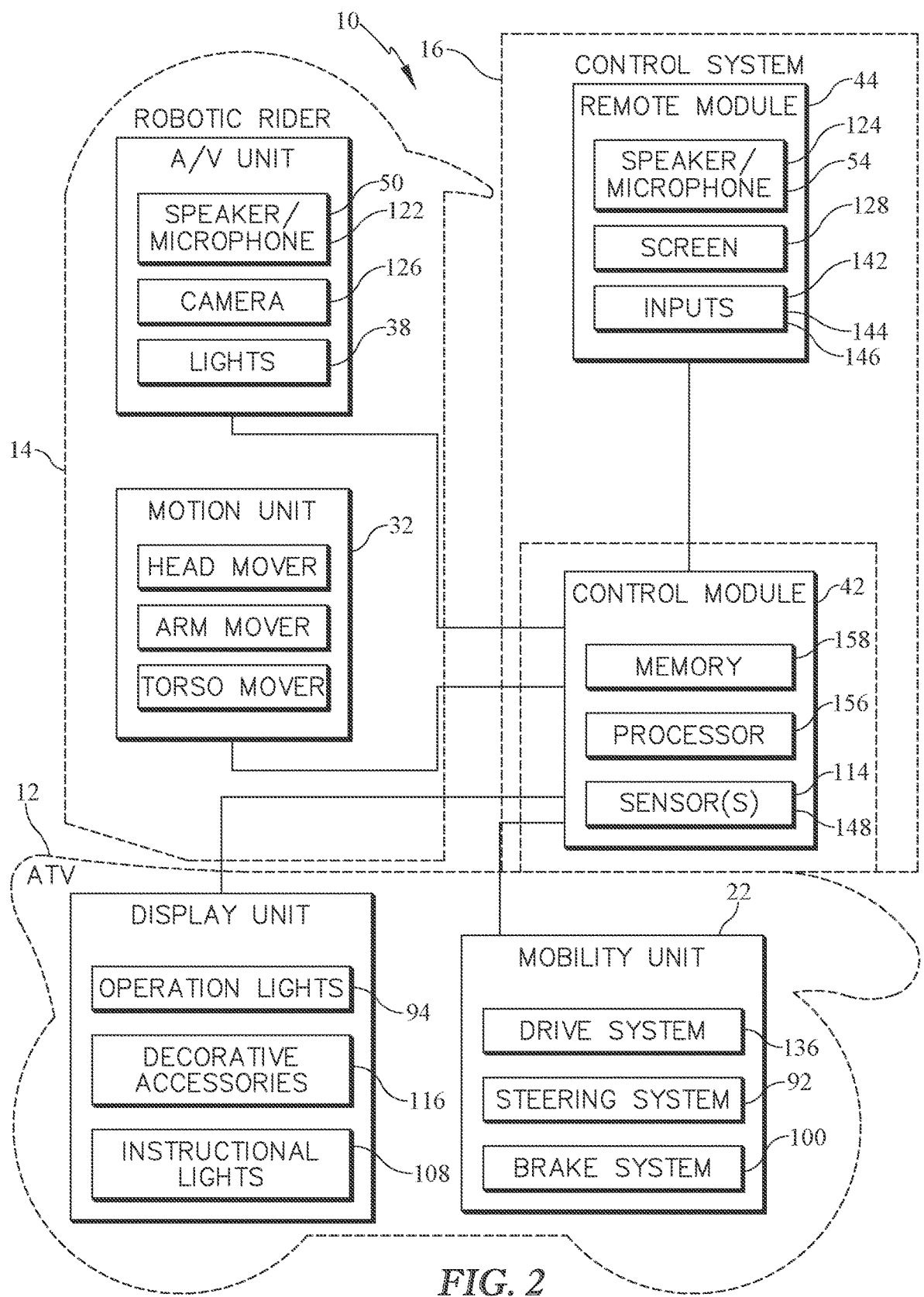
FIG. 2 is a simplified block schematic diagram of the ATV educational demonstration system of FIG. 1 showing that the ATV includes a display unit and mobility unit each connected to communicate with a control module of the control system housed on the ATV, the control system further includes a remote module to relay commands to the ATV and to the animatronic rider, the animatronic rider including an audio and video unit and a motion unit that are connected to communicate with the control module.

In the illustrative embodiment, the ATV educational demonstration system 10 includes a control system 16 as shown in FIG. 2. The control system 16 includes a control module 42 and remote module 44 in communication with the control module 42. The control module 42 includes a processor 156 and a memory device 158 including instructions executed by the processor 156. The control module 42 is electrically connected to the pair of eye light modules 38 and configured to illuminate one or both of the eyes of the pair of eye light modules 38 in response to receipt of a signal (not shown) from the remote module 44. As suggested by FIG. 1, the illumination of the of the eye light modules 38 of the animatronic rider 14 is controllable via operation of the remote module 44 at a distance away from the animatronic rider 14; therefore, the operator of the remote module 44 is able to operate the ATV educational demonstration system 10 without being seen by the audience.

In some illustrative embodiments, the ATV educational demonstration system includes an ATV 12, an animatronic rider 14 coupled to the ATV 12, and a control system 16 coupled to the ATV 12 and the animatronic rider 14, as shown in FIG. 2. The animatronic rider 14 includes a torso 26, a head unit 30 coupled to the torso 26, and a motion unit 32 configured to drive motion of the head unit 30. The head unit 30 is configured to nod by pivoting about a generally horizontal axis 46 to indicate "yes" to an audience and shake by pivoting about a generally vertical axis 48 to indicate "no" to an audience during an interactive educational demonstration, as suggested by FIG. 1.

In the illustrative embodiment, the control system 16 includes a control module 42 and remote module 44 in communication with the control module 42, as shown in FIG. 2. The control module 42 includes a processor 156 and a memory device 158 including instructions executed by the processor 156. The control module 42 is electrically connected to motion unit 32 and configured to cause the head unit 30 to nod or shake in response to receipt of a signal (not shown) from the remote module 44. As suggested by FIG. 1, the nodding and shaking of the head unit 30 of the animatronic rider 14 is controllable via operation of the remote module 44 at a distance away from the animatronic rider 14; therefore, the operator of the remote module 44 is able to operate the ATV educational demonstration system 10 without being seen by the audience.

Figure 4:
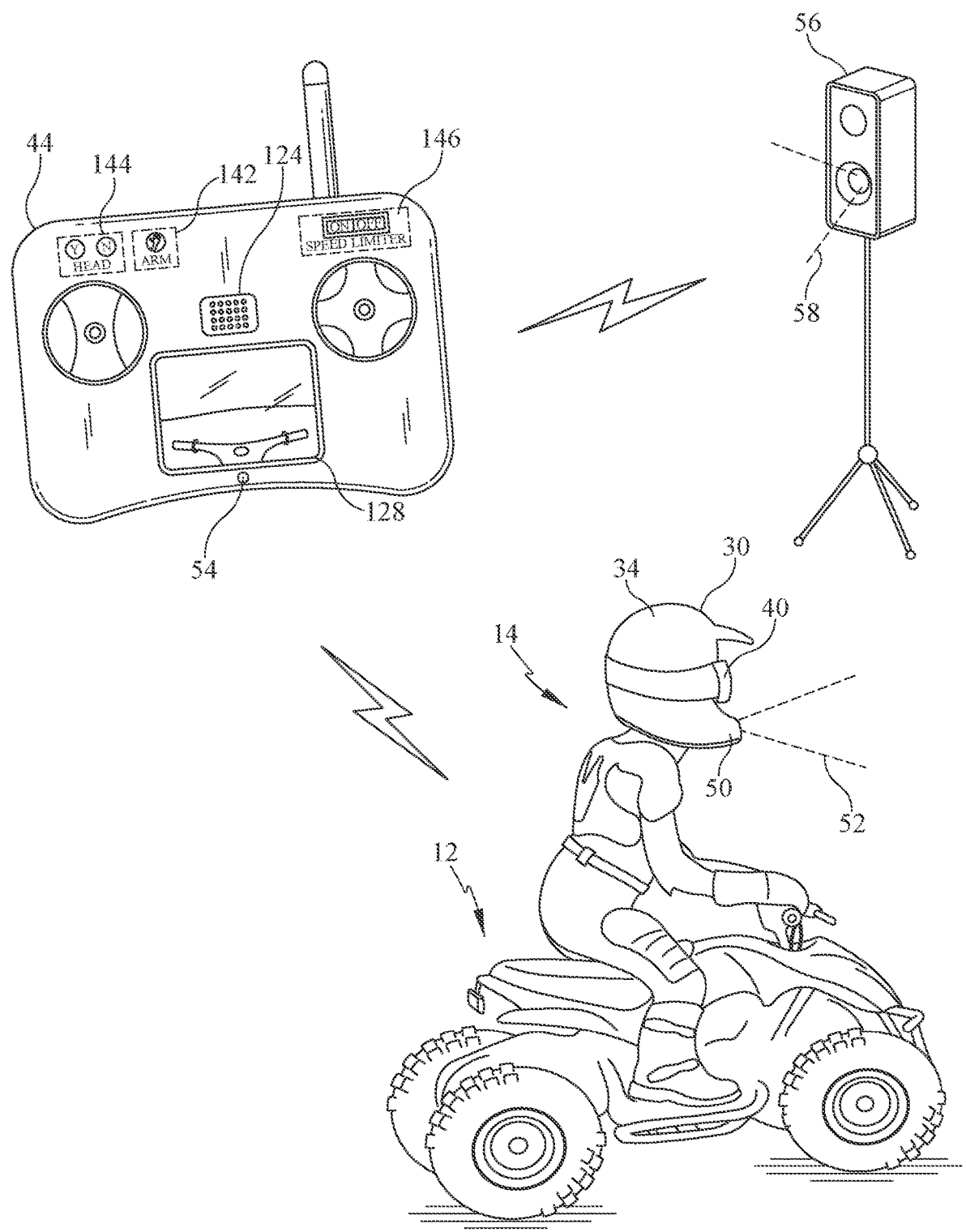
FIG. 4 is a simplified communication schematic showing the remote module of FIG. 3 is configured to communicate with the speaker unit of the animatronic rider of FIG. 1, configured to be located in the head unit of the animatronic rider in this embodiment, and with an external speaker unit.

The head unit 30 includes a helmet 34, and the animatronic rider 14 includes a speaker 50 mounted in the helmet 34 to project audio 52 from inside the helmet 34 out to an audience, as shown in FIG. 4. The speaker 50 is arranged below the pair of eye light modules 38, such that the audio 52 projected out to the audience originates from the head unit 30 in an arrangement that resembles audio projected out from a human mouth. The remote module 44 includes a microphone 54 in communication with the speaker 50. The speaker 50 is configured to amplify and project sounds received by the microphone 54. The ATV educational demonstration system 10 includes an external speaker 56 in communication with the microphone 54 and configured to amplify and project sounds received by the microphone 54 for communication with the audience with enhanced audio output 58 during educational demonstrations.

Figure 5:
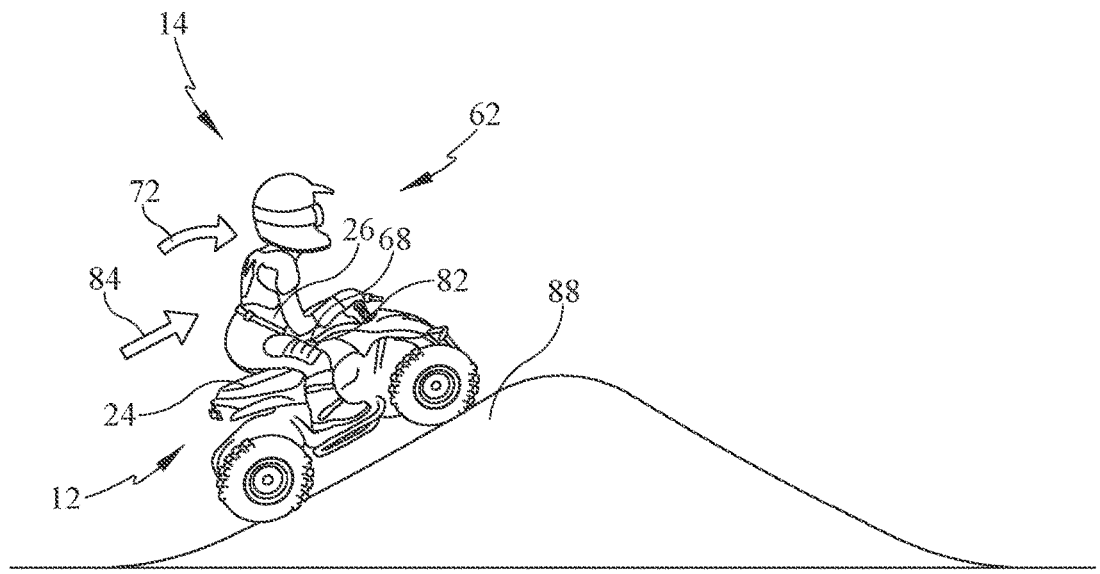
FIG. 5 is a perspective view of the ATV educational demonstration system of FIG. 1 showing an incline demonstration function of the animatronic rider coupled to the ATV while the ATV traverses an inclined surface.
Figure 6:
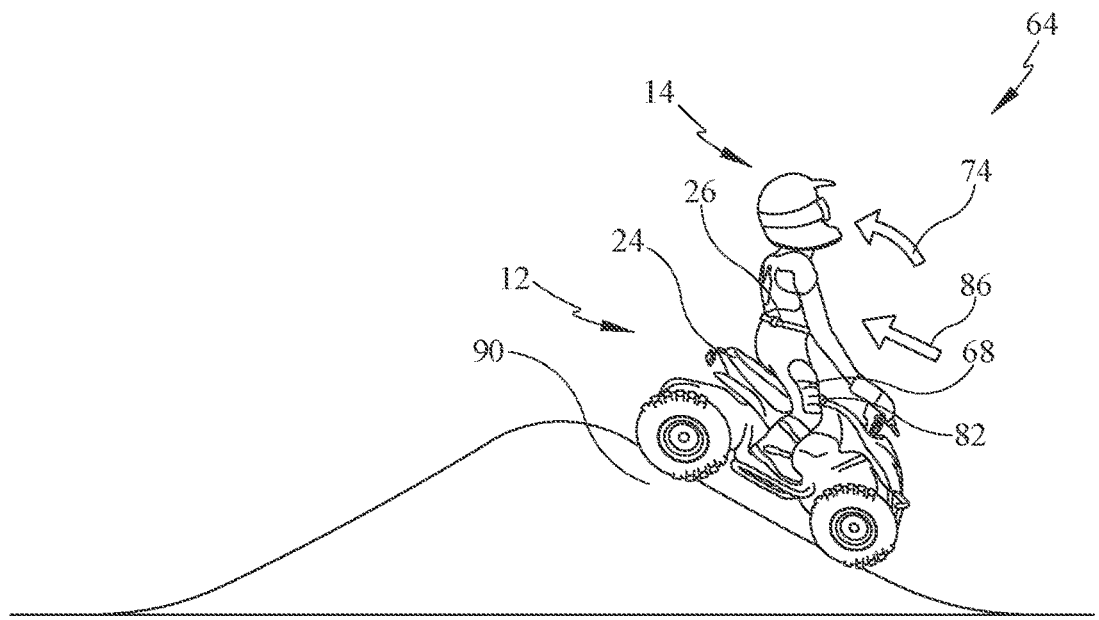
FIG. 6 is a perspective view of the ATV educational demonstration system of FIG. 1 showing a decline demonstration function of the animatronic rider coupled to the ATV while the ATV traverses a declined surface.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a frame 18 with a footrest 20, a mobility unit 22 configured to propel the frame 18 relative to the ground, and an unframed bench seat 24 adapted to be straddled by the animatronic rider 14, as shown in FIGS. 5 and 6. The animatronic rider 14 includes a torso 26 movable relative to the unframed bench seat 24 of the ATV 12 and a motion unit 32 configured to drive motion of the torso 26.

In the illustrative embodiment, the torso 26 is movable between a standard position 60 (as shown in FIG. 1), an uphill position 62 (as shown in FIG. 5), and a downhill position 64 (as shown in FIG. 6). When the torso 26 is in the standard position 60, the torso 26 forms a standard angle 66 relative to a portion 68 of the unframed bench seat 24 that is positioned forward of the torso 26 of the animatronic rider 14. When the torso 26 is in the uphill position 62, the torso 26 forms a forward angle 72 relative to the portion 68 of the unframed bench seat 24. The forward angle 72 is lesser in degrees than the standard angle 66. When the torso 26 is in the downhill position 64, the torso 26 forms a backward angle 74 relative to the portion 68 of the unframed bench seat 24. The backward angle 74 is greater in degrees than the standard angle 66.

In the illustrative embodiment, when the torso 26 is in the standard position 60, the torso 26 is positioned at a standard distance 80 away from a front edge 82 of the unframed bench seat 24 of the ATV 12. When the torso 26 is in the uphill position 62, the torso 26 is positioned at an uphill distance 84 away from the front edge 82 of the unframed bench seat 24. The uphill distance 84 is lesser than the standard distance 80. When the torso 26 is in the downhill position 64, the torso 26 is positioned at a downhill distance 86 away from the front edge 82 of the unframed bench seat 24. The downhill distance 86 is greater than the standard distance 80.

In the illustrative embodiment, the control system 16 includes a control module 42 and remote module 44 in communication with the control module 42, as shown in FIG. 2. The control module 42 includes a processor 156 and a memory device 158 including instructions executed by the processor 156. The control module 42 is electrically connected to motion unit 32 to cause the torso 26 of the animatronic rider 14 to move between the standard position 60, the uphill position 62, and the downhill position 64 in response to receipt of an electrical signal (not shown).

Figure 7:
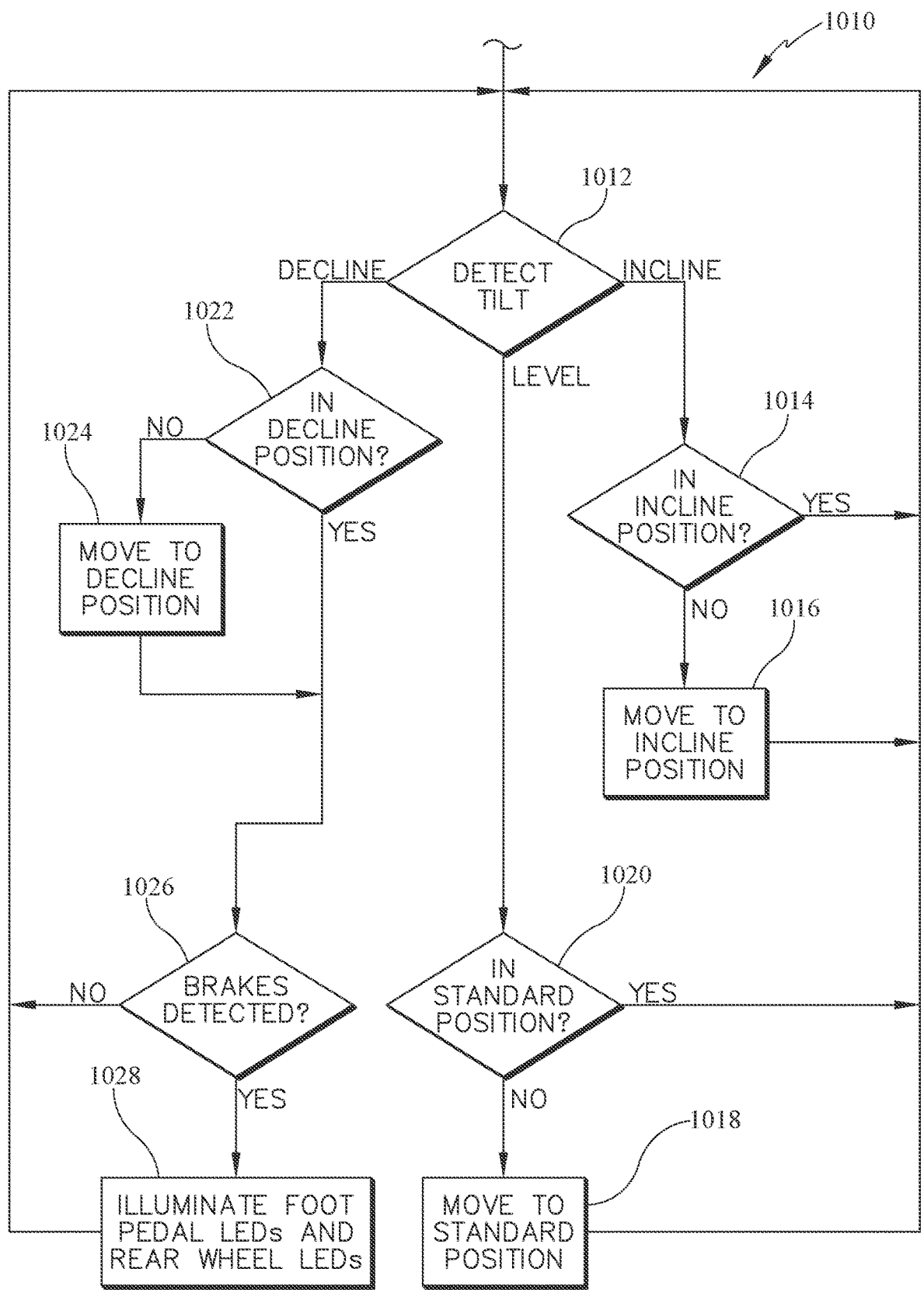
FIG. 7 is a simplified flow diagram of a process for a orientation detection sensor of the control module to relay signals to a processor unit of the control module that is configured to communicate commands to the motion unit of the animatronic rider and the mobility unit of the ATV in response to receipt of sensor signals.

The control module 42 is configured to execute an incline demonstration program 1010, as shown in FIG. 7. The control module is configured to determine the orientation or tilt of the ATV 12 in a decision step 1112. When the control module 42 detects that the ATV 12 is oriented on an incline 88, in a decision step 1014, the control module 42 generates an electrical signal (not shown) associated with the uphill position 62, as suggested by FIGS. 5 and 7. When the electrical signal (not shown) associated with the uphill position 62 is received, the motion unit 32 causes the torso 26 of animatronic rider 14 to move to the uphill position 62, in a step 1016. When the control module 42 detects that the ATV 12 is oriented on a decline 90, in a decision step 1022, the control module 42 generates an electrical signal (not shown) associated with the downhill position 64, as suggested by FIGS. 6 and 7. When the electrical signal (not shown) associated with the downhill position 64 is received, the motion unit 32 causes the torso 26 of the animatronic rider 14 to move to the downhill position 64, in a step 1024. When the control module 42 detects that the ATV 12 is at a level orientation, in a decision step 1020, the control module 42 generates a signal (not shown) associated with the standard position 60. When the electrical signal (not shown) associated with the standard position 60 is received, the motion unit 32 causes the torso 26 of the animatronic rider 14 to move to the standard position 60, in a step 1018, as suggested by FIG. 7.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a frame 18 with a footrest 20, a mobility unit 22 configured to propel the frame 18 relative to the ground, an unframed bench seat 24 adapted to be straddled by the animatronic rider 14, a steering system 92, and operational lights 94. The mobility unit 22 includes a pair of front wheels 96, a pair of rear wheels 98, and a brake system 100 configured to slow or stop the movement of the ATV 12. The steering system 92 includes handlebars 102 configured to turn left or right in accordance with the front wheels 96 during turning of the ATV 12.

The brake system 100 of the ATV 12 includes front brakes 104 configured to brake the front wheels 96 of the ATV 12, rear brakes 106 configured to brake the rear wheels 98 of the ATV 12, and instructional lights 108. The front brakes 104 are actuated separately from the rear brakes 106. The instructional lights 108 are visible to an audience around the ATV 12 when illuminated. The instructional lights 108 include a second instructional lights system 112 optionally mounted on the handlebars 102 or another location nearby to indicate use of front brakes 104 to an audience and a first instructional lights system 110 optionally mounted on the footrest 20 or another location nearby to indicate use of the rear brakes 106 to an audience.

In the illustrative embodiment, the control system 16 includes a control module 42 electrically connected to the instructional lights 108 to selectively illuminate the instructional lights 108, as suggested by FIG. 2. The control module 42 includes a processor 156, a memory device 158 including instructions executed by the processor 156, and a sensor 114 configured to determine the orientation or tilt of the ATV 12, in a decision step 1012, and to transmit a signal (not shown) associated with the orientation of the ATV when the ATV 12 is on a decline 90, as determined in the decision step 1022, as shown by FIG. 7. The control module 42 is configured to illuminate the first instructional lights system 110 when the control module 42 receives the signal (not shown) that indicates that the ATV 12 is oriented on a decline 90 and the rear brakes 106 are activated, as suggested by a decision step 1026 and a step 1028 of FIGS. 6 and 7. The first instructional lights system 110 educates the audiences by demonstrating that only the rear brakes 106 are to be used when the ATV 12 is braking during downhill travel.

In the illustrative embodiment, the control module 42 is configured to illuminate the second instructional lights system 112 when the front brakes 104 are activated to suggest to the audience that the front brakes 104 are in use, as shown in FIG. 1. The operational lights 94 are mounted above the rear wheels 98 of the ATV 12. The control module 42 is configured to illuminate the operational lights 94 when either of the front brakes 104 or the rear brakes 106 is activated to indicate to other motorists that the ATV 12 is slowing or stopping.

In some illustrative embodiments, the ATV educational demonstration system 10 includes an ATV 12, an animatronic rider 14 coupled to the ATV 12 including a display unit 116, and a control system 16 coupled to the ATV 12 and the animatronic rider 14, as shown in FIG. 2. The display unit 116 ATV 12 includes operational lights 94, instructional lights 108, decorative lights 118, and a siren 120. The control module 42 is electrically connected to decorative lights 118 and configured to cause the decorative lights 118 to flash, strobe, or otherwise illuminate. The control module 42 is electrically connected to the siren 120 and configured to cause the siren 120 to sound. The flashing, strobing, other illumination, and sounding are controllable via operation of the remote module 44 at a distance away from the ATV 12; therefore, the operator of the remote module 44 is able to operate the ATV educational demonstration system 10 without being seen by the audience.

In some illustrative embodiments, the ATV educational demonstration system includes an ATV 12, an animatronic rider 14 coupled to the ATV 12, and a control system 16 coupled to the ATV 12 and the animatronic rider 14, as shown in FIG. 2. The animatronic rider 14 includes a torso 26, a head unit 30 coupled to the torso 26, and an audience microphone 122 coupled to the head unit 30. The audience microphone 122 is configured to receive external sounds output by an audience to facilitate two-way communication during interactive educational demonstrations.

Figure 3:
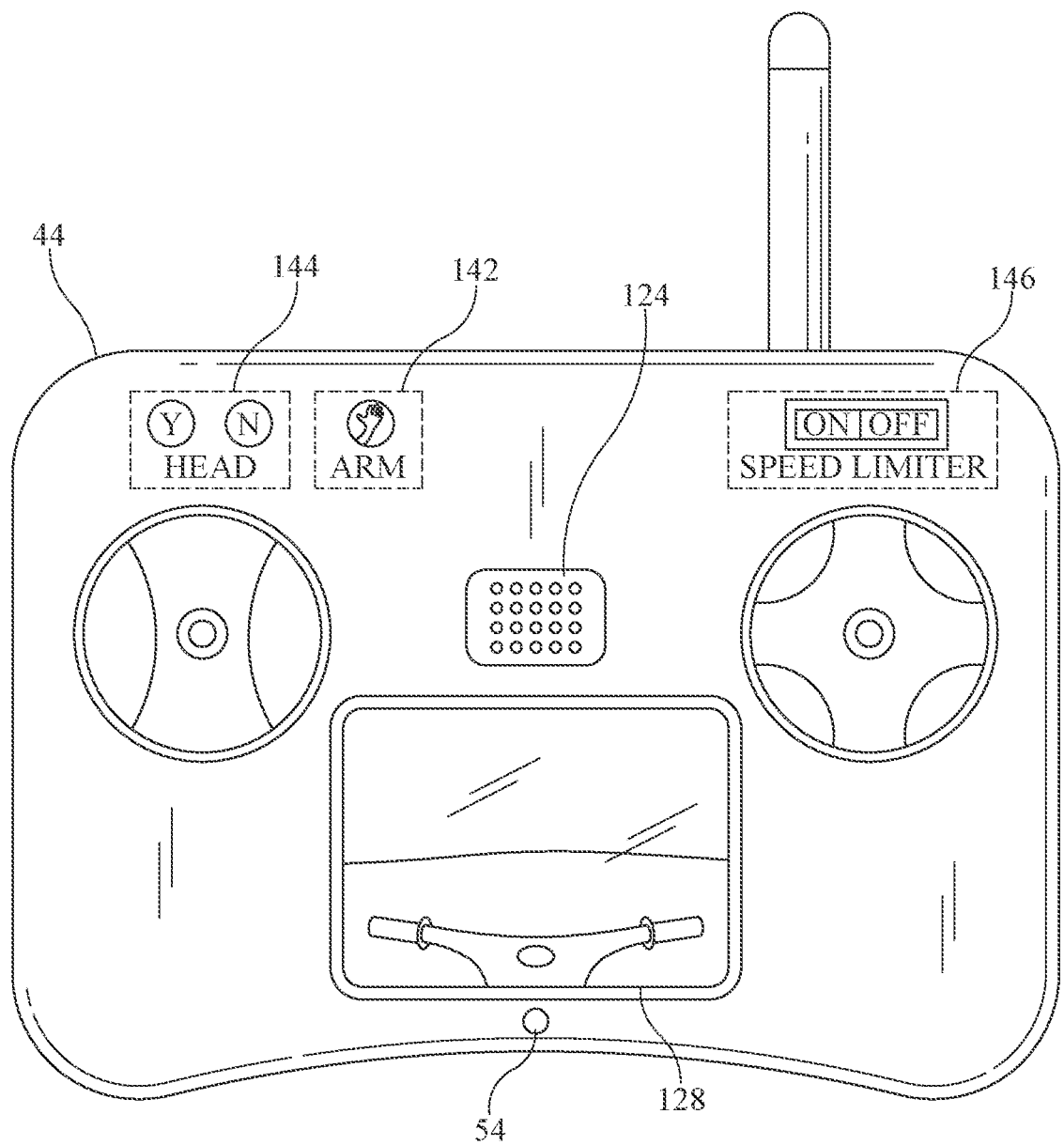
FIG. 3 is a perspective view of an illustrative embodiment of the remote module of FIG. 2 showing a screen, a plurality of inputs, and a speaker and microphone unit.

In the illustrative embodiment, the control system 16 includes a control module 42 and remote module 44 in communication with the control module 42, as shown in FIG. 2. The remote module 44 includes a demonstrator speaker 124 mounted on the remote module 44 to project sounds received from the audience microphone 122 to the operator of the ATV educational demonstration system 10 to facilitate two-way communication between the audience and the operator even when the operator is hidden such that the operator is not in ear shot of the audience, as shown in FIG. 3.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The animatronic rider 14 includes a torso 26, a head unit 30 coupled to the torso 26, and a video camera 126 coupled to the head unit 30. The video camera 126 is configured to capture views of the audience or the surroundings located around the ATV 12.

In the illustrative embodiment, the control system 16 includes a control module 42 and remote module 44 in communication with the control module 42, as shown in FIG. 2. The remote module 44 includes a display screen 128 mounted on the remote module 44 to display the views around the ATV 12 captured by the video camera 126 to the operator of the ATV educational demonstration system 10 to allow the operator to control the ATV educational demonstration system 10 without having a direct light of sight to the ATV educational demonstration system 10, as shown in FIGS. 1 and 3.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a frame 18, a mobility unit 22 configured to propel the frame 18 relative to the ground, an unframed bench seat 24 adapted to be straddled by the animatronic rider 14, and a steering system 92 with handlebars 102, as shown in FIG. 1. The animatronic rider 14 includes a torso 26, an arms unit 130 coupled to the torso 26 and movable relative to the handlebars 102 of the ATV 12, and a motion unit 32 configured to drive motion of the arms unit 130.

In the illustrative embodiment, the arms unit 130 is movable between a riding position 132 and a waving position 134. When the arms unit 130 is in the riding position 132 the each arm of the arms unit 130 is fluidly, independently coupled to the handlebars 102 of the ATV 12. When the arms unit 130 is in the waving position 134 at least one arm of the arms unit 130 is raised above and away from the handlebars 102 to non-verbally communicate with an audience using a motion similar to the wave of a human hand.

In the illustrative embodiment, the control system 16 includes a control module 42 and remote module 44 in communication with the control module 42, as shown in FIG. 2. The control module 42 is electrically connected to motion unit 32 to cause the arms unit 130 of the animatronic rider 14 to move between the riding position 132 and the waving position 134.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a frame 18, a mobility unit 22 configured to propel the frame 18 relative to the ground, an unframed bench seat 24 adapted to be straddled by the animatronic rider 14, and a drive system 136 reconfigurable between a standard speed state 138 and a limited speed state 140. The control system 16 includes a control module 42 and remote module 44 in communication with the control module 42. The control module 42 is electrically connected to the drive system 136 to direct the drive system 136 to reconfigure between the standard speed state 138 and the limited speed state 140. In the limited speed state 140, the ATV 12 is unable to increase beyond a predefined speed to ensure safe operation of the ATV 12 during educational demonstrations.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The control system 16 includes a control module 42 and remote module 44 in communication with the control module 42, as shown in FIG. 2. The control module 42 is electrically connected to motion unit 32 and configured to cause the head unit 30 to nod or shake in response to receipt of a signal (not shown) from the remote module 44. The control module 42 is electrically connected to motion unit 32 to cause the arms unit 130 of the animatronic rider 14 to move between the riding position 132 and the waving position 134. The remote module includes wave inputs 142 configured to initiate arm unit 130 movement, nod-shake inputs 144 configured to initiate head unit movement, and speed limiter inputs 146 configured to change the maximum speed available for the ATV 12, as shown in FIG. 3.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a brake system 100 configured to slow or stop the movement of the ATV 12. The brake system 100 of the ATV 12 includes front brakes 104 configured to brake the front wheels 96 of the ATV 12, rear brakes 106 configured to brake the rear wheels 98 of the ATV 12.

Figure 8:
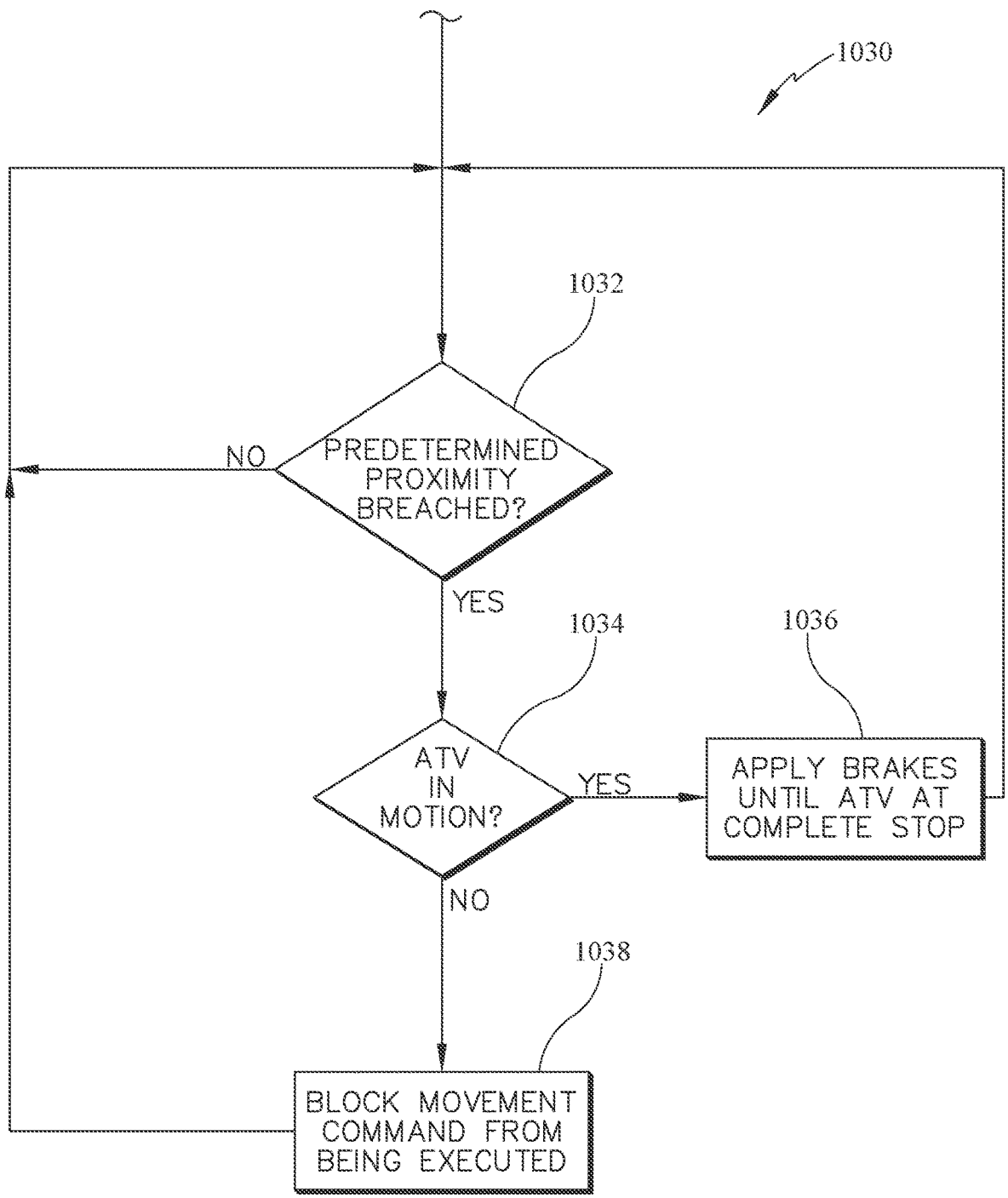
FIG. 8 is a simplified flow diagram of a process for a proximity breach sensor of the control module to relay signals to a ATV motion sensor that is configured to relay signals to the processor unit of the control module that is configured to communicate commands to the mobility unit of the ATV.

In the illustrative embodiment, the control system 16 includes a control module 42 electrically connected to the front brakes 104 and rear brakes 106 to selectively brake the front wheels 96 or rear wheels 98 of the ATV 12. The control module 42 is configured to execute a proximity breach program 1030, as shown in FIG. 8. The control module 42 includes a proximity sensor 148 configured to detect the presence of objects at a predetermined distance away from the ATV 12, in a decision step 1032, and to transmit a signal (not shown) associated with the detection of an object when the object is within the predetermined distance from the ATV 12, as shown in FIG. 8. The control module 42 is configured to activate the front brakes 104 or rear brakes 106 upon receipt of the signal (not shown), in a step 1036, if the ATV 12 is determined to be in motion in a decision step 1034. The control module 42 is configured to prevent the mobility unit 22 from propelling the ATV 12, when the ATV 12 is not in motion, as determined by a decision step 1034 and an object is detected within the predetermined distance from the ATV 12 in a step 1038.

In some illustrative embodiments, the ATV educational demonstration system 10 includes an ATV 12, an animatronic rider 14 coupled to the ATV 12, and a control system 16 coupled to the ATV 12 and the animatronic rider 14, as shown in FIG. 2. The ATV 12 includes a frame 18, a mobility unit 22 configured to propel the frame 18 relative to the ground, and an unframed bench seat 24 adapted to be straddled by the animatronic rider 14, as shown in FIGS. 5 and 6. The animatronic rider 14 includes a torso 26 that is movable and a motion unit 32 configured to drive motion of the torso 26.

Figure 10:
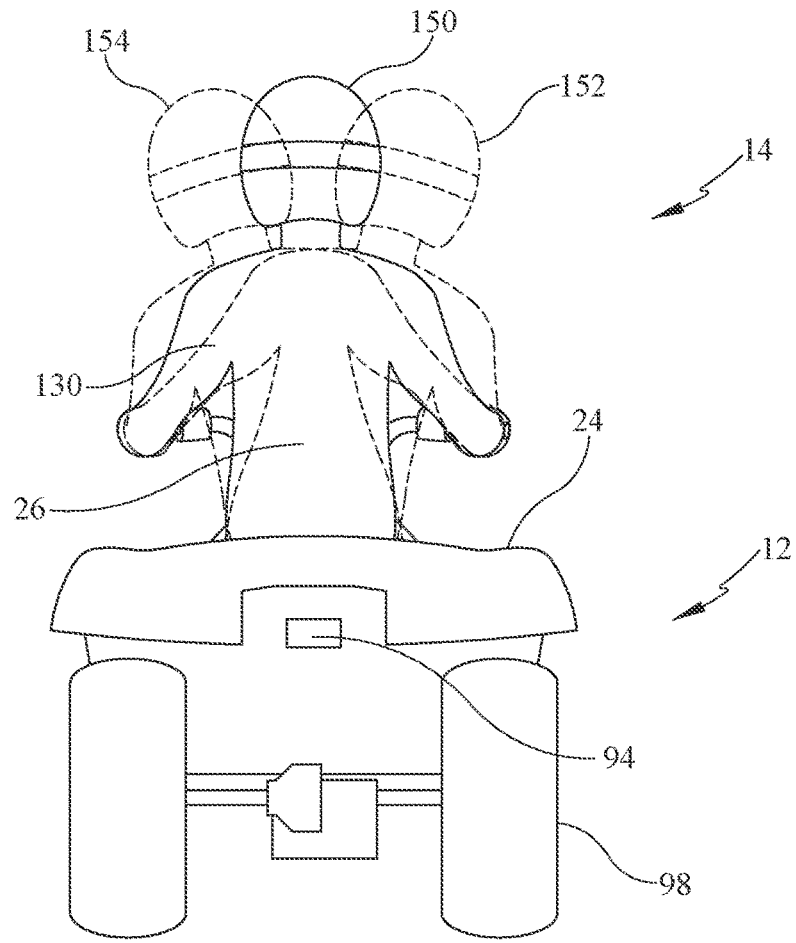
FIG. 10 is a perspective aft view of the animatronic rider of the ATV educational demonstration system of FIG. 1 coupled to the ATV, showing the animatronic rider configured to relate to a drive system of the ATV such that the animatronic rider is in a standard position when the turn detection sensor of the control module does not detect a turn of the drive system of the ATV, a left leaning position when the turn detection sensor of the control module detects a left turn of the drive system of the ATV, and a right leaning position when the turn detection sensor of the control module detects a right turn of the drive system of the ATV.

In the illustrative embodiment, the torso 26 is movable between a middle position 150, a left-leaning position 152, and a right-leaning position 154, as shown in FIG. 10. The control system 16 includes a control module 42 and remote module 44 in communication with the control module 42, as shown in FIG. 2. The control module 42 is electrically connected to motion unit 32 to cause the torso 26 of the animatronic rider 14 to move between the middle position 150, the left-leaning position 152, and the right-leaning position 154, in response to receipt of an electrical signal (not shown).

Figure 9:
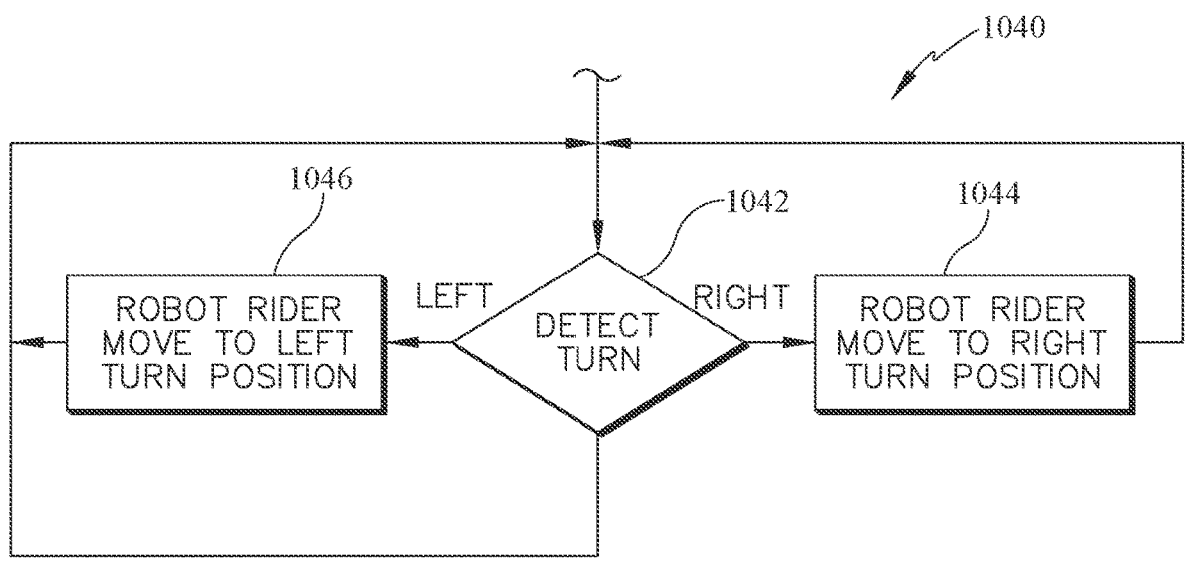
FIG. 9 is a simplified flow diagram of a process for a turn detection sensor of the control module to relay signals to the processor unit of the control module that is configured to communicate commands to the motion unit of the animatronic rider.

The control module 42 is configured to execute a turn-weight-shift program 1040 to determine the presence and direction of a turn of the ATV 12, as suggested by FIG. 9. If the control module 42 determines that the ATV 12 is turning to the right, in a decision step 1042, the control module 42 generates an electrical signal (not shown) associated with a right turn. When the electrical signal (not shown) associated with a right turn is received, the motion unit 32 causes the torso 26 of animatronic rider 14 to move to the right-leaning position 154, in a step 1044, to demonstrate proper weight balancing technique to an audience. When the control module 42 detects that the ATV 12 is turning to the left, in the decision step 1042, the control module 42 generates an electrical signal (not shown) associated with a left turn. When the electrical signal (not shown) associated with a left turn is received, the motion unit 32 causes the torso 26 of animatronic rider 14 to move to the left-leaning position 152, in a step 1046, to demonstrate proper weight balancing technique to an audience.

According to one aspect of the present disclosure, an ATV educational demonstration system may include an ATV and an animatronic rider coupled to the ATV. The ATV may include a frame, a mobility unit configured to propel the frame relative to ground, and an unframed bench seat adapted to be straddled by a rider. The animatronic rider may include a torso, legs, arms, and a head unit. The head unit may include a helmet, an at least semi-transparent eye shield, and a pair of eye light modules arranged inside the helmet. The pair of eye light modules may be arranged as eyes of a rider relative to the semi-transparent eye shield so as to be visible from outside the helmet included in the head unit.

In some embodiments, the ATV educational demonstration system may include a control system. The control system may include a control module electrically connected to the pair of eye light modules and a remote module in communication with the control module. The control module may be configured to illuminate one or both of the eye light modules in response to receipt of a signal from the remote module. The at least semi-transparent eye shield may be included in safety goggles.

According to another aspect of the present disclosure, an ATV educational demonstration system may include an ATV, an animatronic rider coupled to the ATV, and a control system. The ATV may include a frame, a mobility unit configured to propel the frame relative to ground, and an unframed bench seat adapted to be straddled by a rider. The animatronic rider may include a torso, a head unit coupled to the torso to (i) nod by pivoting about a generally horizontal axis to indicate yes and (ii) to shake by pivoting about a generally vertical axis to indicate no, and a motion unit configured to drive motion of the head unit. The control system may include a control module electrically connected to the motion unit and a remote module in communication with the control module. The control module may be configured to cause the head unit to nod or shake in response to receipt of a signal from the remote module.

In some embodiments, the head unit may include a helmet. The animatronic rider may include a speaker mounted in the helmet to project audio from inside the helmet. The remote module may include a microphone in communication with the speaker, and the speaker may be configured to amplify and project sounds received by the microphone. The ATV educational demonstration system may include an external speaker spaced apart from the ATV and animatronic rider, and the external speaker may be configured to amplify and project sounds received by the microphone.

In some embodiments, the head unit may include a helmet, an at least semi-transparent eye shield, and a pair of eye light modules arranged inside the helmet, and the pair of eye light modules may be arranged as eyes of a rider relative to the semi-transparent eye shield so as to be visible from outside the helmet included in the head unit. The at least semi-transparent eye shield may be included in safety goggles. The control module may be configured to illuminate one or both of the eye light modules in response to receipt of a signal from the remote module.

According to another aspect of the present disclosure, an ATV educational demonstration system may include an ATV, an animatronic rider coupled to the ATV, and a control system. The ATV may include a frame, a mobility unit configured to propel the frame relative to ground, and an unframed bench seat adapted to be straddled by a rider. The animatronic rider may include a torso movable relative to the ATV and a motion unit. The ATV motion unit may be configured to drive motion of the torso.

In some embodiments, the torso may be movable relative to the frame between a standard position, an uphill position, and a downhill position. The torso in the standard position may form a standard angle relative to a portion of the unframed bench seat in front of the animatronic rider. The torso in the uphill position may form a forward angle relative to a portion of the unframed bench seat in front of the animatronic rider that is smaller than the standard angle. The torso in the downhill position may form a back angle relative to a portion of the unframed bench seat in front of the animatronic rider that is greater than the standard angle. The control system may include a control module electrically connected to the motion unit to direct motion of the torso included in the animatronic rider. The control module may be configured to cause the torso of the animatronic rider to move from the standard position to the uphill position or the downhill position in response to receipt of an electrical signal.

In some embodiments, the control module may include a sensor. The sensor may be configured to determine the orientation of the ATV. The sensor may be configured to generate an electrical signal associated with the uphill position when the ATV is oriented on an incline. The sensor may be configured to generate an electrical signal associated with the downhill position when the ATV is oriented on a decline. The torso in the standard position may be arranged a standard distance from a front edge of the unframed bench seat. The torso in the uphill position may be arranged an uphill distance from the front edge of the unframed bench seat that is smaller than the standard distance. The torso in the downhill position may be arranged a downhill distance from the front edge of the unframed bench seat that is larger than the standard distance.

According to another aspect of the present invention, an ATV educational demonstration system, the system includes an ATV, an animatronic rider coupled to the ATV, and a control system. The ATV includes a frame, an unframed bench seat adapted to be straddled by a rider, a brake system with separately actuated front brakes and rear brakes, and instructional lights visible to an audience around the ATV when illuminated.

In some embodiments, the control system may include a controller electrically connected to the instructional lights to selectively illuminate the instructional lights and a sensor coupled to the control system. The sensor may be configured to determine the orientation of the ATV and to transmit a signal associated with the orientation of the ATV when on a decline. The controller may be configured to illuminate the instructional lights in response to receipt of the signal when the rear brakes are activated to suggest to the audience that only the rear brakes are to be used when the ATV is braking during downhill travel. The instructional lights may be mounted at a footrest of the ATV.

In some embodiments, the instructional lights may be a first instructional lights system, and the ATV educational demonstration system may include a second instructional lights system mounted on a handlebar unit of the ATV frame. The controller may be configured to illuminate the second instructional lights system when the front brakes are activated to suggest to the audience that the front brakes are in use. The ATV educational demonstration system may include operation lights mounted away from the instructional lights. The controller may be configured to illuminate the operation lights when the rear brakes or the front brakes are activated to indicate braking of the ATV.

In an illustrative embodiment, the ATV system 10 helps to increase awareness about ATV safety. The ATV system 10 is engaging, interactive, and educational. The animatronic rider 14 of the ATV system 10 is outfitted with full safety gear and LED lights. The safety gear and LED lights educate audiences (often young audiences) about safe operating habits for ATVs and engage the audience during educational demonstrations.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An ATV educational demonstration system, the system comprising
    an ATV including a frame, a mobility unit configured to propel the frame relative to ground, and an unframed bench seat adapted to be straddled by a rider, and
    an animatronic rider coupled to the ATV, the animatronic rider including a torso positioned over the unframed bench seat of the ATV to move relative to the frame among a normal center position by extending normally relative to the unframed bench seat, a left-leaning position by extending at an angle relative to a portion of the unframed bench seal and a left side of the torso, and a right-leaning position by extending at an angle relative to a portion of the unframed bench seal and a right side of the torso; a head unit coupled to the torso to (i) nod by pivoting about a generally horizontal axis to indicate yes and (ii) to shake by pivoting about a generally vertical axis to indicate no; and a motion unit configured to drive motion of the head unit and the torso, and
    a control system including a control module electrically connected to the motion unit and a remote module in communication with the control module,
    wherein the control module is configured to cause the head unit to nod or shake in response to receipt of a signal from the remote module, and
    wherein the control module is configured to cause the torso of the animatronic rider to move to the left-leaning position if the control module determines that the ATV is turning to the left, the right-leaning position if the control module determines that the ATV is turning to the right, and the normal center position if the control module determines that the ATV is not turning to one of the right and the left to demonstrate proper weight balancing techniques when operating the ATV to an audience.

2. The system of claim 1, wherein the head unit includes a helmet, the animatronic rider includes a speaker mounted in the helmet to project audio from inside the helmet.

3. The system of claim 2, wherein the remote module includes a microphone in communication with the speaker and the speaker is configured to amplify and project sounds received by the microphone.

4. The system of claim 3, further comprising an external speaker spaced apart from the ATV and animatronic rider and the external speaker is configured to amplify and project sounds received by the microphone.

5. The system of claim 1, wherein the head unit includes a helmet, an at least semi-transparent eye shield, and a pair of eye light modules arranged inside the helmet, and the pair of eye light modules are arranged as eyes of a rider relative to the semi-transparent eye shield so as to be visible from outside the helmet included in the head unit.

6. The system of claim 5, wherein the at least semi-transparent eye shield is included in safety goggles.

7. The system of claim 5, wherein the control module is configured to illuminate one or both of the eye light modules in response to receipt of a signal from the remote module.

8. An ATV educational demonstration system, the system comprising
    an ATV including a frame, a mobility unit configured to propel the frame relative to ground, and an unframed bench seat adapted to be straddled by a rider, and
    an animatronic rider coupled to the ATV, the animatronic rider including a torso positioned over the unframed bench seat of the ATV and movable relative to the ATV and a motion unit configured to drive motion of the torso, wherein the torso is movable relative to the frame among a normal center position by extending normally relative to the unframed bench seat, a left-leaning position by extending at an angle relative to a portion of the unframed bench seal and a left side of the torso, and a right-leaning position by extending at an angle relative to a portion of the unframed bench seal and a right side of the torso,
    and a control system including a control module configured to cause the torso of the animatronic rider to move among the normal center position, the left-leaning position, and the right-leaning position, wherein if the control module determines that the ATV is turning to the right the motion unit causes the torso of animatronic rider to move to the right-leaning position, and if the control module determines that the ATV is turning to the left the motion unit causes the torso of animatronic rider to move to the left-leaning position.

9. The system of claim 8, wherein the control module is configured to execute a turn-weight-shift program to determine the presence and direction of a turn of the ATV.

10. The system of claim 8, wherein the control module is configured to generates an electrical signal associated with a left turn or a right turn upon determination that the ATV is turning.

11. The system of claim 8, wherein if the control module determines that the ATV is not turning to the right or the left, the motion unit causes the torso of animatronic rider to move to the normal center position.

12. The system of claim 8, wherein the ATV includes a brake system with separately actuated front brakes, separately actuated rear brakes, and separately actuated instructional lights visible to an audience around the ATV when illuminated, and wherein (i) the control module includes a sensor configured to determine the configuration of the ATV and to transmit a signal associated with the configuration of the ATV when on a decline, and (ii) the control module is configured to illuminate the instructional lights in response to receipt of the signal when the rear brakes are activated to suggest to the audience that only the rear brakes are to be used when the ATV is braking during downhill travel.

13. The system of claim 12, wherein the instructional lights include a first instructional lights system mounted at a footrest of the ATV and a second instructional lights system mounted on a handlebar unit of the frame of the ATV, and wherein the control module is configured to illuminate the second instructional lights system when the front brakes are activated to suggest to the audience that the front brakes are in use.

14. The system of claim 8, wherein (i) the torso is movable relative to the frame between a standard position, an uphill position, and a downhill position included in the plurality of positions, (ii) the torso in the standard position forms a standard angle relative to a portion of the unframed bench seat in front of the animatronic rider, (iii) the torso in the uphill position forms a forward angle relative to a portion of the unframed bench seat in front of the animatronic rider that is smaller than the standard angle, and (iv) the torso in the downhill position forms a back angle relative to a portion of the unframed bench seat in front of the animatronic rider that is greater than the standard angle, and wherein the control module is configured to cause the torso of the animatronic rider to move from the standard position to the uphill position or the downhill position in response to receipt of an electrical signal.

15. The system of claim 14, wherein the control module includes a sensor configured to determine the configuration of the ATV and to generate an electrical signal associated with the uphill position when the ATV is oriented on an incline.

16. The system of claim 15, wherein the sensor is configured to generate an electrical signal associated with the downhill position when the ATV is oriented on a decline.

17. The system of claim 14, wherein the torso in the standard position is arranged a standard distance from a front edge of the unframed bench seat, the torso in the uphill position is arranged an uphill distance from the front edge of the unframed bench seat that is smaller than the standard distance, and the torso in the downhill position is arranged a downhill distance from the front edge of the unframed bench seat that is larger than the standard distance.

18. The system of claim 17, wherein the control module includes a sensor configured to determine the configuration of the ATV and to generate an electrical signal associated with the uphill position when the ATV is oriented on an incline.

19. The system of claim 18, wherein the sensor is configured to generate an electrical signal associated with the downhill position when the ATV is oriented on a decline.

* * * * *